United States Patent Office 3,560,600
Patented Feb. 2, 1971

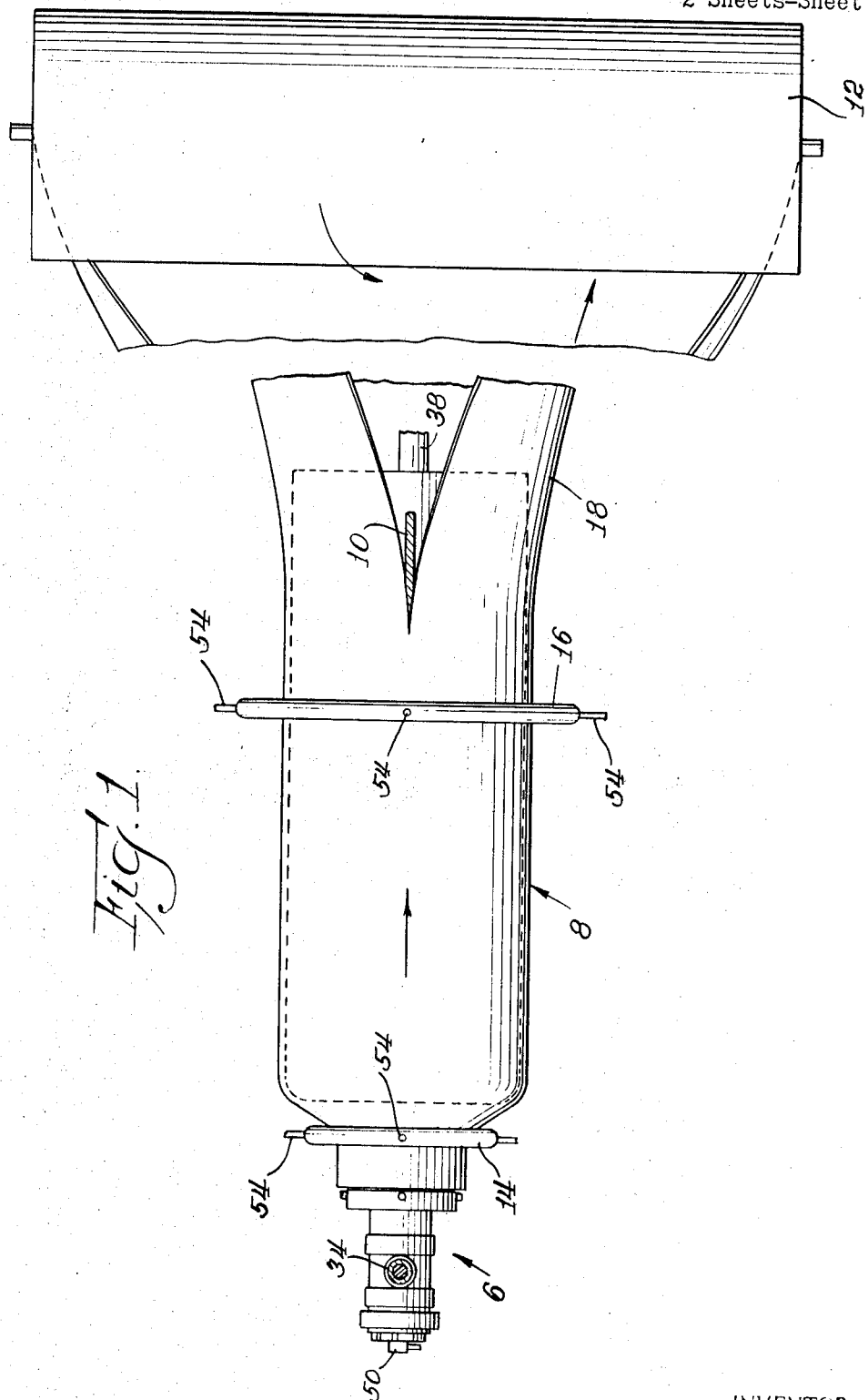

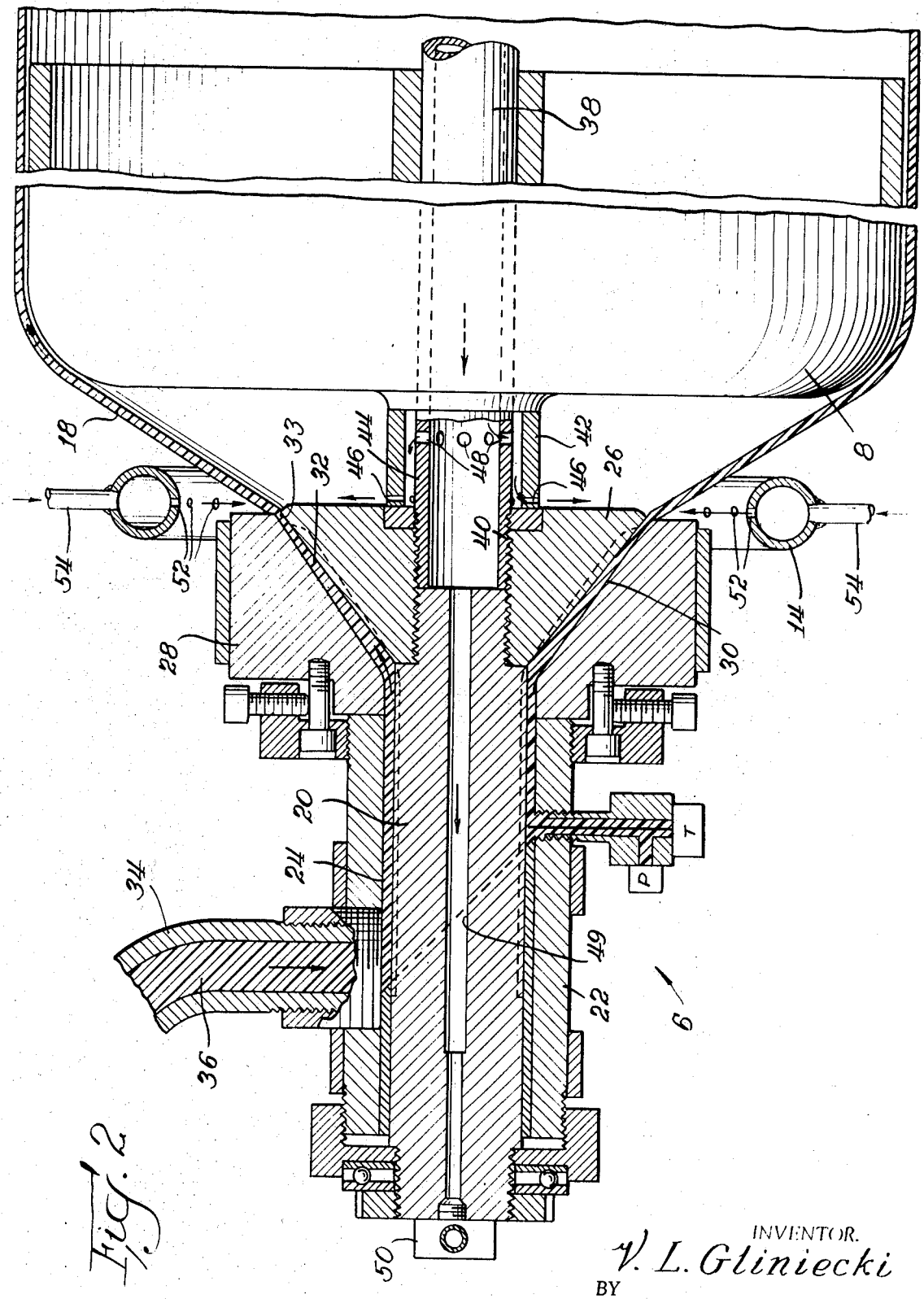

3,560,600
SURFACE TREATMENT ON EXTRUDED PLASTIC FOAM
Vern L. Gliniecki, Bay City, Mich., assignor to The Dow Chemical Company, Midland, Mich., a corporation of Delaware
Filed Nov. 7, 1963, Ser. No. 322,088
Int. Cl. B29d 29/00
U.S. Cl. 264—48                     2 Claims

ABSTRACT OF THE DISCLOSURE

Method and apparatus for directing a cooling medium on opposite sides of a tubular foam extrudate to provide a high quality sheet having exceptionally smooth, high gloss surface free of defects.

---

This invention relates to an improvement in the extrusion of plastic foam whereby a high quality sheet, which is exceptionally smooth, has high gloss, and is free of surface defects, such as broken cells, is produced on conventional equipment.

The extrusion of foam into plastic sheets is a relatively new development. Polystyrene foam was first extruded from expandable beads early in 1959. The new material received widespread publicity and great expectations were entertained for use of the new material in film, sheet, rod and tubular form. However, early expectations were not generally realized primarily because of certain reasons, such as, processing difficulties, and economic factors.

Of the various foam products possible with extrusion processing, film and sheeting have exceptional potential, because of certain advantageous characteristics of extruded foam such as, low thermal conductivity, water and grease resistance, dielectric strength, and favorable price structure. Such features render foam extruded film and sheeting especially useful in packaging, and cushioning applications.

The principles of the subject invention may be utilized to extrude an expandable foam sheet on a conventional extruder, which sheet will have good surface quality, that is, very smooth, and free of defects such as ruptured cells. The difficulty with using conventional extrusion apparatus is that there is not enough inventory time to allow extrusion of the foam at more desirable low temperatures, such as in the neighborhood of 250° F. At higher temperatures there is a greater incidence of cell rupture.

The inventive concept relates to the use of a cooling medium, such as compressed air, to cool the extrudate as it emerges from the extruding die. This results in a strengthening of the film surface on both sides of the extrudate so that the expansive force of the foam blowing agent in the extrudate material, does not rupture the cells which form the material. The desirable surface conditions on the extruded foam are thus realized.

The main object of this invention is to provide an improvement in the extrusion of plastic foam.

A more specific object is to provide a method whereby expandable plastic foam may be extruded, in sheet form, which extruded sheet material will have a smooth surface, free of defects, such as ruptured cells.

These and further objects and features of the invention will become more apparent from the following description and accompanying drawing wherein:

FIG. 1 is a fragmentary exterior view of apparatus embodying the principles of the invention; and FIG. 2 is an enlarged cross-section view of a portion of the same.

With reference to FIG. 1, the apparatus illustrated includes an extruder die assemblage 6, a mandrel 8, a slitter blade 10, a spreader roll 12, and exterior fluid ejector rings 14 and 16. The apparatus is shown in operation wherein a tubular foam extrudate 18, such as polystyrene, is being expressed from the die assemblage 6, following which it is longitudinally split by the slitter blade 10, spread flat by the roll 12, and passed on for use in fabricating operations, or wound on storage rolls (not shown).

The die assemblage 6 includes a cylindrical central yoke 20 positioned within a cylindrical sleeve 22, so that a uniform annular passageway 24 is provided therebetween. The forward end of the yoke 20 is provided with a frusto-conical portion 26, which is surrounded by circular die 28 having a tapered inner surface 30, formed to provide a uniformly tapered passageway 32 terminating in an orifice 33. An off-set feed pipe 34 is positioned in the sleeve 22 for feeding foam material 36 into the passageway 24 from an extruder (not shown). The forming mandrel 8 is supported upon a pipe, or hollow shaft 38 having a threaded end 40 engageable with the yoke portion 26.

The apparatus above described and illustrated in the drawings, is conventional and well known to those skilled in the art. For example, the extruder may be of the type made by the National Rubber Machinery Company, while the die assemblage may be like that made by the Johnson Manufacturing Company. It is believed unnecessary for a full understanding of the invention to discuss further details of the extruder, or die assemblage. Rather, the inventive concept, as pointed out hereinbefore, relates to the manner of improving the condition of the extrudate, especially the surface condition thereof, by means of which will now be described in detail.

With reference to FIG. 2, it will be seen that a sleeve 42 is positioned between the end of the mandrel 8 and yoke portion 26, and in annular spaced relation to a reduced portion 44 of the mandrel shaft 38. A plurality of radial holes 46 are formed in the sleeve 42, which are arranged to direct jets of cooled, compressed medium, such as air, toward the tubular extrudate 18 as it emerges from the orifice 33. Said air is conducted through the shaft 38 and through holes 48 formed in the reduced portion 44, to the radial holes 46. Excess air is allowed to pass through a passageway 49 formed in the yoke 20, and to atmosphere via a flow control valve 50. Attention is directed to the fact that the air flow from the mandrel 8 through the yoke passageway 49, serves to cool the yoke and thus provide better temperature control of the material being extruded. Air flow upon the extrudate emerging from the orifice 33 gives the inner surface of the extrudate 18 an improved gloss, cell rupture is reduced, and over-riding temperatures at the die are prevented. The air jetted on the inside of the extrudate, serves the further function of providing a layer of air between the mandrel and the extrudate, thereby preventing rubbing or sliding as the extrudate is moved along the mandrel.

The ring 14, which is of toroidal configuration, is provided with a plurality of radially disposed holes 52 arranged to direct jets of cooled, compressed medium, such as air toward the extrudate as it emerges from the orifice 33. Such air is fed to the ring 14 by a plurality of pipes 54 equi-angularly connected about the ring 14, and served by a source of pressure fluid (not shown). The air jetted on the outside of the extrudate, improves the surface condition of the extrudate in the same manner as the air jetted on the inside by the radial holes 46 in the sleeve 42. The ring 16 is constructed and operated in substantially the same manner as the ring 14, and will provide further beneficial results, especially where additional cooling is necessary, or desirable.

In operation of the cooling jet means, both inside and outside of the tubular extrudate, the amount of air flow for optimum results will depend on certain variables, such as, tubular diameter, wall thickness, rate of extrusion, type of material, etc. In any given case, air flow rates and pressures can be determined by simple experimentation. In other words, once the extruding operation is started, the air flow is adjusted until optimum results are obtained. In general, the air pressure utilized does not exceed about 7 p.s.i., although under special circumstances, e.g., extra large diameter extrudate, this figure may be exceeded. The compressed air may be at room temperature, or may be pre-cooled, if necessary, to achieve sufficient cooling effect.

From the foregoing it will be seen that the apparatus, and method of treating a foam extrudate, as disclosed above, will satisfy all of the objectives set forth hereinbefore.

The foregoing description has been given in detail without thought of limitation since the inventive principles involved are capable of assuming other forms without departing from the spirit of the invention or the scope of the following claims.

What is claimed is:

1. A method of forming a tubular extrusion of a thermoplastic resin form comprising extruding a hot hollow tube of a foamable thermoplastic resin, quench chilling the external wall of said tube by fluid chilling means surrounding said wall within a short time after it emerges from the extrusion die to form an impervious, non-porous, external skin, quench chilling the internal wall of said tube by fluid chilling means surrounded by said wall within a short time after it emerges from the extrusion die to form an impervious, non-porous, internal skin, said chilling of said external and internal walls being insufficient to cool the major portion of the tube whereby the core of the tube expands to form a foam.

2. A process according to claim 1 wherein the interior and exterior quenching is accomplished by impinging a cool fluid at high velocity on the interior and exterior walls of the tube.

References Cited

UNITED STATES PATENTS 2,461,630   2/1949   Cozzo
                            264—Cellular-Crusted Digest PHILIP E. ANDERSON, Primary Examiner U.S. Cl. C.R.

18—14; 161—161; 264—177, 209